United States Patent
Figge et al.

(10) Patent No.: US 12,297,858 B2
(45) Date of Patent: May 13, 2025

(54) OUTER SLEEVE OF A CONNECTION ELEMENT WITHOUT A FEMALE THREAD AND HAVING A DAMPING FUNCTION, CONNECTION ELEMENT COMPRISING AN OUTER SLEEVE, AND CORRESPONDING CONNECTION AND MANUFACTURING METHOD

(71) Applicant: Böllhoff Verbindungstechnik GmbH, Bielefeld (DE)

(72) Inventors: Hans-Ulrich Figge, Schloß Holte-Stukenbrock (DE); Ingo Burger, Schloß Holte-Stukenbrock (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 505 days.

(21) Appl. No.: 17/046,275

(22) PCT Filed: Mar. 21, 2019

(86) PCT No.: PCT/EP2019/057153
§ 371 (c)(1),
(2) Date: Oct. 8, 2020

(87) PCT Pub. No.: WO2019/197131
PCT Pub. Date: Oct. 17, 2019

(65) Prior Publication Data
US 2021/0071695 A1 Mar. 11, 2021

(30) Foreign Application Priority Data
Apr. 11, 2018 (DE) .................... 10 2018 108 633.4

(51) Int. Cl.
*F16B 5/02* (2006.01)
*F16B 41/00* (2006.01)
*F16B 37/06* (2006.01)

(52) U.S. Cl.
CPC .......... *F16B 5/0241* (2013.01); *F16B 5/0258* (2013.01); *F16B 5/0225* (2013.01); *F16B 37/067* (2013.01); *F16B 41/002* (2013.01)

(58) Field of Classification Search
CPC .... F16B 5/0241; F16B 5/0258; F16B 5/0225; F16B 37/067; F16B 41/002; F16B 21/183
(Continued)

(56) References Cited

U.S. PATENT DOCUMENTS 3,014,563 A * 12/1961 Bratton ................. F16B 37/065
403/167
3,128,999 A * 4/1964 Schmitt ................. F16B 5/0233
267/153
(Continued)

FOREIGN PATENT DOCUMENTS

CN 101135331 A 3/2008
DE 9001069 U1 4/1990
(Continued)

OTHER PUBLICATIONS

English translation of the International Preliminary Report on Patentability for PCT/EP2019/057153 dated Oct. 13, 2020, (7 pages).
(Continued)

*Primary Examiner* — Kristina R Fulton
*Assistant Examiner* — Jock Wong
(74) *Attorney, Agent, or Firm* — Reising Ethington P.C.

(57) ABSTRACT

A connection element without a female thread, having a damping function, and by which two components can be connected. The connection element has an outer sleeve, a spacer sleeve, and a screw having a first outer diameter and a tolerance compensation disc positioned on the screw. The outer sleeve has an outer body having a shaft with a fastening flange at a first end and, adjacent to a second end,
(Continued)

a folding zone which can form a compression bead. The outer sleeve has a first inner diameter and a second inner diameter smaller than the first. A first component can be supported between the fastening flange and the compression bead. The second component can be fastened, adjacent to the second end of the outer sleeve, by the sleeve. The screw and the tolerance compensation disc are positioned in the outer sleeve with radial play.

10 Claims, 8 Drawing Sheets

(58) Field of Classification Search
USPC .................... 411/544, 546, 999; 248/638
See application file for complete search history.

(56) References Cited

U.S. PATENT DOCUMENTS

| | | | | |
|---|---|---|---|---|
| 3,218,101 | A * | 11/1965 | Adams | F16F 3/0873 |
| | | | | 267/141 |
| 3,534,797 | A * | 10/1970 | Haug | F16B 5/0258 |
| | | | | 411/970 |
| 4,007,659 | A * | 2/1977 | Stencel | F16B 19/1054 |
| | | | | 411/34 |
| 4,067,531 | A * | 1/1978 | Sikula | F02B 77/13 |
| | | | | 277/916 |
| 4,521,004 | A | 6/1985 | Caldwell | |
| 4,732,519 | A | 3/1988 | Wagner | |
| 5,871,319 | A | 2/1999 | Schneider | |
| 6,095,736 | A * | 8/2000 | Miller | F16B 41/002 |
| | | | | 411/352 |
| 7,393,169 | B2 | 7/2008 | Süßenbach | |
| 8,066,465 | B2 | 11/2011 | Figge et al. | |
| 2008/0179488 | A1 * | 7/2008 | Tsuge | F16F 15/08 |
| | | | | 123/574 |
| 2008/0240852 | A1 | 10/2008 | Weh et al. | |
| 2010/0202856 | A1 * | 8/2010 | Donovan | F16B 5/0258 |
| | | | | 411/546 |
| 2011/0033259 | A1 * | 2/2011 | Zhou | F16B 5/0241 |
| | | | | 411/22 |
| 2015/0345527 | A1 * | 12/2015 | Durfee, Jr. | F16B 5/0208 |
| | | | | 29/559 |
| 2019/0154073 | A1 | 5/2019 | Figge et al. | |

FOREIGN PATENT DOCUMENTS

| | | | | |
|---|---|---|---|---|
| DE | 4131779 | A1 * | 3/1993 | ............ F16B 41/002 |
| DE | 3784325 | T2 | 6/1993 | |
| DE | 19654848 | A1 | 6/1997 | |
| DE | 19836107 | A1 * | 2/2000 | ............ F16B 5/0258 |
| DE | 10259976 | A1 * | 7/2004 | ............ B25B 23/00 |
| DE | 102005047356 | A1 | 4/2007 | |
| DE | 102008014389 | A1 * | 9/2009 | ............ F16B 41/002 |
| DE | 102014201936 | A1 * | 8/2015 | ............ F16B 5/0241 |
| DE | 102015208997 | A1 | 12/2015 | |
| DE | 102016112014 | A1 | 1/2018 | |
| EP | 0751305 | A1 | 1/1997 | |
| EP | 1710454 | A1 | 10/2006 | |
| FR | 942642 | A * | 2/1949 | |
| GB | 2197302 | A * | 5/1988 | ............ F16B 29/00 |
| GB | 2240603 | A | 8/1991 | |
| WO | WO-2008028678 | A1 * | 3/2008 | ............ B60S 1/0488 |
| WO | WO-2009030480 | A2 * | 3/2009 | ............ F16B 41/002 |
| WO | WO-2013192558 | A1 * | 12/2013 | ............ F16B 5/0241 |

OTHER PUBLICATIONS

CN Office Action for CN Application No. 201980025124.6 dated Oct. 11, 2021, (19 pages).
Written Opinion & International Search Report for PCT/EP2019/057153 dated Jun. 21, 2019, 10 pages.

* cited by examiner

OUTER SLEEVE OF A CONNECTION ELEMENT WITHOUT A FEMALE THREAD AND HAVING A DAMPING FUNCTION, CONNECTION ELEMENT COMPRISING AN OUTER SLEEVE, AND CORRESPONDING CONNECTION AND MANUFACTURING METHOD

1. TECHNICAL FIELD

The present disclosure is related to an outer sleeve of a connection element without a female thread with a damping function, a corresponding connection element with which at least a first component and a second component are connectable via a screw connection as well as corresponding connection and manufacturing methods.

2. BACKGROUND

From German utility model 90 01 069.8, a blind rivet nut is known which consists of an elastic outer body and a metallic thread insert. The elastic outer body has a sleeve-like shaft with a fastening flange and a folding zone, with the shaft being pluggable into a fastening hole of a support part and with the folding zone being foldable to form a compression bead which forms a locking head, so that the blind rivet nut is fixed at the fastening part by the fastening flange on the one hand and by the compression bead on the other hand. When it comes to the afore-mentioned blind rivet nut, the thread bush is divided into a thread element and a spacer sleeve, with the spacer sleeve abutting the bottom side of the fastening part at the end of the folding process. Embodiments are also known where the thread bush is configured as one part.

EP 1 710 454 B1 discloses a blind rivet for a screw connection between a support part and a fastening part. This blind rivet consists of an elastic outer body with a sleeve-like shaft, pluggable into a fastening hole of a support part, comprising a fastening flange and a folding zone which can be folded to form a compression bead, which can be supported on opposite sides of the support part. Furthermore, the blind rivet comprises a metallic bush which is arranged within the outer body. The outer body, which for example consists of a thermoplastic elastomer will be injection-molded, thereby encompassing the bush. During this process, an anchoring projection of the outer body is generated which engages into a ring-shaped puncture of the anchoring section of the bush. In this way, the outer body and the bush that is arranged in the inside form a form-fit connection. When the blind rivet is axially compressed in a screw connection, the compression bead develops in the folding zone.

A fastener with a damping function, with which at least a first and a second component can be connected via a screw connection is described in DE 10 2016 112 014 A1. The fastener consists of the following components: an elastically deformable outer sleeve, a support sleeve arranged therein as well as a screw sleeve arranged in the outer sleeve with a telescope portion. When establishing the connection between the two components, the outer sleeve folds, with the support sleeve and the screw sleeve being pushed into one another.

The above described connection elements have in common that the outer sleeve is arranged in the support part and the fastening part is arranged adjacent to the fastening flange. A disadvantage in connection with an accessibility from only one side of the components to be connected is therefore that a thread which interacts with the screw must already be provided in the outer sleeve. A further disadvantage of these connection elements is that particularly in case of a large number of connection points between the first and the second component, it becomes clear that a radial tolerance compensation is not realizable or only difficult to realize.

DE 37 84 325 T2 describes a fastener assembly for use in connection with a first and a second component, each being provided with an opening. The fastener assembly comprises a fastener, a disc and a passage out of an elastic material. The fastener comprises a head and a shaft with the shaft comprising an upper thread-free shaft section, a lower shaft section that is provided with a thread and projecting means which are arranged between the upper thread-free shaft portion and the lower shaft portion that is provided with a thread. The passage and the disc are assigned to the fastener in a telescope-like way. With this arrangement, a fastener assembly is provided which has an obvious axial play between the fastener and the disc. Furthermore, the fastener assembly can be arranged in a first component such that the fastener does not protrude from the bottom side of the first workpiece. A disadvantage of the fastener assembly is that no radial tolerance compensation can be realized.

An assembly part with a vibration-dampened fastening hole is finally described in DE 196 54 848 A1. A collar out of a rubber-elastic material lies in the fastening hole with a collar neck having an approximately cylindrical circumferential form and is penetrated by an assembly sleeve lying in its through hole and is indirectly or directly impinged, in the tightening direction, by a head-sided ring collar of the assembly sleeve or by the screw head of a screw lying in the assembly sleeve with its shaft. The assembly part comprises an undercut in the portion of its fastening hole which flanks a portion of the collar neck, namely its fixing portion. The inner wall of the through hole which is assigned to the fixing portion tapers with respect to the tightening direction to the neck end in a hopper-like way. The coat of the assembly sleeve has such a diameter and such a circumferential form that when entering through the undercut portion, the latter is widened in radial direction such that on the one hand, the undercut in the portion of the fastening hole is undercut and, on the other hand, is fixed within the collar due to elastic restoring forces within the collar. With this arrangement, radial tolerances between the connection points of two components cannot be compensated, either.

The object of at least some implementations of the present invention is therefore to remove the above disadvantages and to provide an outer sleeve of the connection element without female thread with damping function, with which especially in case of a large number of connection points, the assembly is facilitated, in particular with respect to compensating radial tolerances. It is also an object of at least some implementations of the present invention to provide a corresponding connection element as well as the associated connection and manufacturing methods.

3. SUMMARY

The above object is solved by an outer sleeve of a connection element without a female thread with a damping function, a connection element without a female thread with a damping function with which at least a first component and a second component can be connected via a screw connection, a first component with an outer sleeve or connection element, a connection between two components by means of a connection element, a connecting method of a first component with a second component by means of a connection element as well as a manufacturing method of an outer sleeve and a manufacturing method of a connection element. Further embodiments and further developments result from the following description, the drawings as well as the appending claims.

An outer sleeve of a connection element without a female thread with a damping function comprises: an elastic outer body with a sleeve-like shaft, which comprises a fastening flange at a first axial end and, adjacent to a second axial end, a hollow-cylindrical folding zone which can be folded to form a compression bead so that a first component can be supported between the fastening flange and the compression bead, a first inner diameter arranged in the portion of the fastening flange and a second inner diameter in the portion of the hollow-cylindrical folding zone, with the first inner diameter being greater than the second inner diameter and a second component being fastenable adjacent to the second axial end.

In the following, the outer sleeve is described when being used in a connection element for connecting a first component with a second component. In this context, the use at one connection point is first of all exemplary described before reference is made to the particularly advantageous use in case of a plurality of connection points between two components to be fastened to one another.

When it comes to the exemplary use of the outer sleeve in a connection element, the outer sleeve already comprises a spacer sleeve with a third inner diameter, the spacer sleeve being arranged adjacent to the second axial end. The function of the spacer sleeve is described later in connection with an embodiment. The connection element furthermore includes a screw which comprises an inner drive feature. The inner drive feature is for example a hexagon socket which is provided at the screw head. Alternatively to that, an outer drive feature can be provided for later rotating in the screw.

The outer sleeve may be arranged in an opening, which may be a round opening, in a first component. The first component is an attachment part or fastening part. This is the first difference with respect to the above discussed known outer sleeves and connection elements which are arranged in the support component, i.e. the second component. After having arranged the outer sleeve in the first component, the first component is arranged adjacent to the fastening flange. A diameter of the opening in the first component is therefore larger than the outer diameter of the folding zone in the initial state of the outer sleeve, but smaller than the diameter of the fastening flange.

The first component now is aligned with respect to the second component such that the outer sleeve is aligned with a fastening portion of the second component in the first component. In this connection, the second axial end of the outer sleeve is arranged adjacent to the fastening portion of the second component. The fastening portion of the second component provides an inner thread for the screw of the connection element.

The screw is plugged into the outer sleeve from the direction of the fastening flange and is screwed into the fastening portion of the second component. According to an example, a disc below the screw head is used which has an outer diameter that is larger than the second inner diameter. This will also become clear in connection with the connection element that is described later in detail, and with which a tolerance compensation disc is used. Alternatively to that, the disc can be omitted when the outer diameter of the head of the screw is larger than the second inner diameter.

Screwing in causes the compression of the outer sleeve and thus the formation of the compression bead and takes place until the spacer sleeve prevents a further screwing-in. In this way, after being screwed-in tight, the first component is arranged between the compression bead and the fastening flange, whereas the second component is arranged adjacent to the second axial end of the outer sleeve.

With respect to the dimensioning, the screw has an outer diameter that is smaller than the second inner diameter of the outer sleeve and also smaller than the third inner diameter of the spacer sleeve. In this way, there is no thread connection between screw and outer sleeve and/or screw and spacer sleeve. Rather, the screw is arranged in the outer sleeve with a lateral or radial play.

Under consideration of this special dimensioning, the special advantage of the outer sleeve, particularly in case of a large number of connection points between the first and the second component, becomes clear. When the first component is equipped with a large number or plurality of round openings, in each of which an outer sleeve is arranged, radial tolerances can then be compensated particularly easily in the course of the alignment to the fastening portions of the second component due to the radial movability of the screw in the outer sleeve and the spacer sleeve. In particular, no long holes must be provided in order to compensate tolerances. Furthermore, and in contrast to long holes, radial tolerances can be compensated in the plane and not only along one axis by means of the outer sleeve that is designed in such a way. Furthermore, despite the different configuration, the accessibility from one side only is sufficient. That means that overall, the outer sleeve provides a simplified use in connection with reduced manufacturing costs.

According to a further embodiment, a plurality of evenly spaced locking notches may be provided at a radial outside, so that the outer sleeve can be fastened in a first opening in the first component such that the first component can be arranged between the fastening flange and the plurality of locking notches. In some implementations, three locking notches be provided. In this way, the outer sleeve is held in a loss-proof manner in the opening of the first component.

In a further embodiment, at least a first fastening feature for fastening the spacer sleeve is provided in the portion of the hollow-cylindrical folding zone adjacent to a second axial end at a radial inside. With respect to the later use of the outer sleeve in a connection element, the spacer sleeve provides for a limitation of the folding zone. In particular, and as described in connection with the later use of the connection element, a compression is only possible until the spacer sleeve abuts with one end at the second component and with the second end at a tolerance compensation disc adjacent to the head of the screw. Furthermore, the inner diameter of the spacer sleeve is larger than the outer diameter of the screw. Thus, the screw is arranged within the spacer sleeve with a radial play, too.

Adjacent to the first axial end, the outer sleeve may include a holding feature for interaction with a holding disc at a radial inside, so that a screw with a tolerance compensation disc can axially be fixed in the portion of the fastening flange. In this way, it may be the tolerance compensation disc that is arranged in a loss-proof manner in the portion of the fastening flange. In this regard, the tolerance compensation disc includes an outer diameter that is larger than the second inner diameter. As the inner diameter of the holding disc is larger than the head diameter of the screw but smaller than the outer diameter of the tolerance compensation disc, the tolerance compensation disc cannot fall out axially of the later connection element.

According to a further embodiment, the outer sleeve consists of an elastically deformable plastic material. In this context, the outer body may consist of an elastomer or a thermoplastic elastomer, which may be on a polyester basis or out of a cross-linked elastomer. Depending on the application case, materials with a good resistance to chemicals and/or thermal forming are chosen from this material range. The polyester-based elastomer may be a polybutylene terephthalate (PBT) or polyethylene terephthalate (PET). Further, non-concluding examples for elastomers are ethylene propylene diene rubber (EPDM), acrylonitrile butadiene rubber (NBR), silicone rubber (VMQ) and chemically chlorosulphonated polyethylene (CSM). The elastic outer body may consist of a silicone or a similar chemically and thermally resistant material.

A connection element without a female thread with a damping function, with which at least a first component and a second component are connectable via a screw connection, comprises the following features: an outer sleeve, a spacer sleeve that is arranged in the outer sleeve adjacent to the second axial end with a third inner diameter, a screw with a first outer diameter, with the first outer diameter being smaller than the third inner diameter of the spacer sleeve, so that the screw is arranged in the outer sleeve with a radial play and the second component can be fastened by means of the screw adjacent to the second axial end of the outer sleeve, as well as a tolerance compensation disc that is arranged on a shaft of the screw, having a second outer diameter that is smaller than the first inner diameter of the outer sleeve, so that the tolerance compensation disc is arranged in the outer sleeve with a radial play. With regard to the use and function of the connection element, reference is made to the above explanations regarding the outer sleeve. The same applies with respect to the arising advantages.

When establishing a connection with the help of the connection element, firstly, the screw comes into engagement with the inner thread of the fastening portion of the second component. During screwing in the screw, the outer sleeve is axially compressed by means of the tolerance compensation disc and the folding bead develops between the first and the second component. This causes the first component, i.e. the attachment part, to be supported between the folding bead and the fastening flange while the second component, i.e. the support part, is fastened adjacent to the second axial end of the outer sleeve. In connection with the established connection, the axial end of the spacer sleeve that is arranged adjacent to the second axial end of the outer sleeve, may also abut the second component.

As the screw with tolerance compensation disc is arranged with radial play in the outer sleeve and the spacer sleeve, a radial tolerance compensation can take place in an easy way particularly in case of a plurality of connection points between the first and the second component, as is explained above. In a further embodiment, the screw therefore has a centre point in order to facilitate the initial screwing in. Furthermore, the spacer sleeve does not have an inner thread, i.e. is configured threadless in the inside.

With regard to the size of the radial tolerance compensation, the latter can be adapted specifically to the respective application by means of a suitable combination of the inner diameters of the outer sleeve and the spacer sleeve as well as the outer diameters of the screw and the tolerance compensation disc. In a further embodiment, the radial distance between the outer thread of the screw and the inside of the spacer sleeve and the radial distance between the radial outside of the tolerance compensation disc and the radial inside of the fastening flange have the same size.

According to a further embodiment of the connection element, the outer sleeve may have a plurality of evenly spaced locking notches at a radial outside, so that the outer sleeve can be fastened in a first opening in the first component such that the first component can be arranged between the fastening flange and the plurality of locking notches. In particular, three locking notches are provided. The outer sleeve may include at least a first fastening feature at a radial inside in the portion of the hollow-cylindrical folding zone adjacent to a second axial end, the feature interacting with a corresponding second fastening feature of the spacer sleeve. With regard to the advantages arising in this connection, reference is also made to the explanations in relation to the outer sleeve.

In a further embodiment, the connection element furthermore has a holding disc, the inner diameter of which is smaller than the outer diameter of the tolerance compensation disc and the radial outer portion of which engages a holding feature at the radial inside of the outer sleeve adjacent to the first axial end, so that the tolerance compensation disc is arranged with a radial play in the outer sleeve and is held in axial direction due to the holding disc. Due to this arrangement, the tolerance compensation disc can be held in the fastening flange in a loss-proof manner whilst at the same time, maintaining the radial play in the axial direction.

In this connection, the screw may include a securing bush on the shaft, axially spaced to a head of the screw, so that the tolerance compensation disc is held between the head and the securing bush. In this way, first of all, the tolerance compensation disc can be arranged at the screw in a loss-proof manner. Thereby, in combination with the above-mentioned holding disc, a further advantage arises from this, namely that the screw can be held in the connection element in a loss-proof manner.

With regard to this embodiment, it is particularly advantageous when the distance between the head and the securing bush corresponds to a maximum protrusion of the screw over the second axial end of the outer sleeve, so that when the screw is flush with the second axial end of the outer sleeve, the securing bush abuts the tolerance compensation disc. In this way, the holding disc cannot accidentally be pushed out of the arrangement even in the case that the screw is flush with the second axial end.

In a further embodiment, the outer sleeve and the holding disc consist of plastic material. With regard to the corresponding choice of material, reference is made to the above explanations regarding the outer sleeve.

Finally, the spacer sleeve, the screw and the tolerance compensation disc may consist of metal, in particular of steel. In this way, a high-strength metal-metal connection can be realized and the applied mechanical loads are distributed optimally. It is furthermore avoided that the established connection is weakened, for example due to material relaxation.

A first component with at least one opening comprises an outer sleeve arranged therein or a connection element arranged therein. With regard to the arising advantages, reference is made to the above explanations regarding the outer sleeve as well as to the connection element, in order to avoid unnecessary repetitions.

In a further embodiment, the first component includes a plurality of openings with outer sleeves or connection elements arranged therein, in particular at least two, or at least three. In case of a component with a plurality of openings, the special advantages of the outer sleeve and thus also of the connection element take effect, as already explained at the beginning.

A connection of a first component with a second component takes place by means of a connection element, with the second component including a fastening portion with inner thread, into which portion the screw is screwed in. Here, with regard to the arising advantages, reference is also made to the above explanations regarding the outer sleeve as well as the connection element, in order to avoid repetitions.

In a further embodiment of the connection, the first component includes a plurality of openings with connection elements arranged therein, in particular at least two, or at least three, and the second component includes a corresponding number of fastening portions. In case of a component with a plurality of openings, the special advantages of the outer sleeve and thus also of the connection element take effect. For example, no long holes are necessary in the first component for the compensation of radial tolerances. In particular, a radial tolerance compensation takes place in a plane by means of the connection element, whereas in case of a long hole, a tolerance compensation can only be realized along one axis.

A connection method of a first component with a second component by means of a connection element comprises the steps: providing the first component with an outer sleeve of the connection element, the sleeve being arranged in a first opening of the first component, aligning the at least one opening of the first component with outer sleeve of the connection element arranged therein with at least one fastening portion of the second component, with the fastening portion providing an inner thread which matches an outer thread of a screw of the connection element, and screwing the screw into the inner thread of the fastening portion. By means of the connection method, the connection of two components can be established by means of the connection element. Therefore, with regard to the arising advantages, reference is made to the above explanations.

In a further embodiment, the step of providing the first component with an outer sleeve of the connection element that is arranged in a first opening of the first component comprises the arranging of the outer sleeve in the first component. The arranging of the outer sleeve can, when the connection method takes place within one single manufacturing site, take place directly before providing the first component for alignment with the second component. Alternatively, the arranging can also take place separately from that. For example, the first component can be provided with the outer sleeve during its manufacturing and before its delivery or further transporting to a further manufacturing site.

In a further embodiment, the step of providing comprises providing the first component with a plurality of outer sleeves which are arranged in a plurality of first openings, particularly at least two, or at least three.

As already explained above, in case of a component with a plurality of openings, the special advantages of the outer sleeve and thus also of the connection element take effect.

An alternative connection method of a first component with a second component by means of a connection element, with the connection element furthermore including a holding disc, the inner diameter of which is smaller than the outer diameter of the tolerance compensation disc and the radial outer portion of which engages a holding feature at the radial inside of the outer sleeve adjacent to the first axial end so that the tolerance compensation disc is arranged in the outer sleeve with a radial play and is held in an axial direction due to the holding disc, and the screw comprises a securing bush on the shaft, axially spaced to a head of the screw so that the tolerance compensation disc is held between the head and the securing bush, comprises the steps: providing the first component with a connection element with screw being arranged in a first opening of the first component, aligning the at least one opening of the first component with connection element arranged therein with at least one fastening portion of the second component, with the fastening portion providing an inner thread that matches the outer thread of the screw of the connection element, and screwing the screw into the inner thread of the fastening portion. Due to the specific arrangement of the connection element, this connection method may be adapted to a completely automated operation. All steps may be carried out in a completely automated way. The advantages which arise from that are, besides the advantages already discussed above, that the connection element can be processed in a completely automated way, thereby saving time and costs.

In an advantageous configuration, the step of providing the first component with a connection element that is arranged in a first opening of the first component comprises the arranging of the connection element in the first opening, with the arranging optionally taking place in an automated way, e.g. by means of a robot or an assembly machine. The automated processing is realizable particularly due to the specific construction of the connection element, so that this connection method is particularly efficient.

The step of providing may include providing the first component with a plurality of connection elements which are arranged in a plurality of first openings, in particular at least two, or at least three. Especially in case of a component with a plurality of openings, the special advantages of the outer sleeve and thus also of the connection element take effect.

A manufacturing method for an outer sleeve comprises the steps: providing a mold, in particular an injection mold which comprises a cavity that is configured complementary with respect to the outer sleeve to be formed, molding, in particular injection-molding an elastic plastic material, in particular an elastomer into the cavity and removing the formed outer sleeve from the mold after the plastic material has cured. The outer sleeve can be produced by means of the manufacturing method. Therefore, with regard to the arising results, reference is made to the above explanations.

In a further embodiment, the manufacturing method comprises the following steps: providing a spacer sleeve in the mold before molding so that the spacer sleeve is overmolded, or plugging-in the spacer sleeve after removing the outer sleeve from the mold. In this way, the outer sleeve can be provided together with the spacer sleeve, which facilitates the subsequent processing, e.g. in connection with the connection method.

A manufacturing method for a connection element includes the steps: providing an outer sleeve, which was in particular produced by means of a manufacturing method, and arranging a spacer sleeve therein, adjacent to a second axial end of the outer body of the outer sleeve, plugging-in a screw with tolerance compensation disc into the outer sleeve and spacer sleeve so that a head of the screw as well as the tolerance compensation disc are arranged adjacent to the first axial end of the outer sleeve, as well as arranging a holding disc adjacent to the first axial end so that the tolerance compensation disc is held in axial direction. Thus, the connection element can be manufactured by means of the manufacturing method. With regard to the resulting advantages, reference is therefore also made to the corresponding above explanations.

In a further embodiment, the manufacturing method includes the following further step before plugging-in the screw: arranging the tolerance compensation disc on the screw and subsequently, arranging a securing bush on the shaft so that the tolerance compensation disc is held between the head and the securing bush.

4. BRIEF DESCRIPTION OF THE DRAWINGS

In the following, the present disclosure will be described in detail based on the drawings. In the drawings, the same reference signs denote the same components and/or elements. It shows.

5. DETAILED DESCRIPTION

In the following, an embodiment of an outer sleeve 10 as well as an embodiment of a connection element 1 is described in detail. In this context, the use of the connection element 1 as well as of the outer sleeve 10 is described with regard to the connection of two components 3, 5. In this case, the first component 3 may be an attachment part and the second component 5 is a support part.

Figure 1:
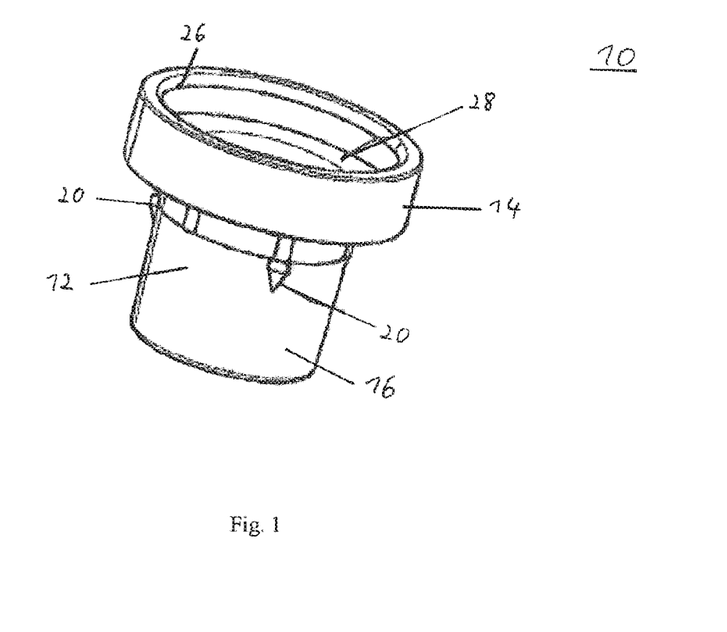
FIG. 1 a perspective view of an embodiment of an outer sleeve.

Subsequently, with reference to FIG. 1, a perspective view of an embodiment of the outer sleeve 10 is illustrated which consists of an elastically deformable plastic material. Exemplary materials for the outer sleeve 10 may be elastomers or thermoplastic elastomers based on polyester or out of a cross-linked elastomer. Depending on the application case, materials with a good resistance to chemicals and/or thermal forming are chosen from this material range. The polyester-based elastomer may be a polybutylene terephthalate (PBT) or polyethylene terephthalate (PET). Further, non-concluding examples for elastomers are ethylene propylene diene rubber (EPDM), acrylonitrile butadiene rubber (NBR), silicone rubber (VMQ) and chemically chlorosulphonated polyethylene (CSM). The outer sleeve 10 may consist of a silicone or a similar chemically and thermally resistant material.

The outer sleeve 10 includes an elastic outer body with a sleeve-like shaft 12. The outer body comprises a fastening flange 14 at a first axial end. Similarly, the elastic outer body includes a hollow-cylindrical folding zone 16 which can be folded to form a compression bead 18 and which is adjacent to a second axial end.

The outer sleeve 10 includes a first inner diameter in the portion of the fastening flange 14 and a second inner diameter in the portion of the hollow-cylindrical folding zone 16. The first inner diameter is larger than the second inner diameter. In this way, a contact surface 28 is formed at the inside of the outer sleeve 10 in the portion of the transition from the fastening flange 14 to the hollow-cylindrical folding zone 16 or the sleeve-like shaped shaft 12, respectively.

Adjacent to the fastening flange 14, three evenly spaced locking notches 20 are provided at the radial outside of the outer sleeve 10. During the later use of the outer sleeve 10, the outer sleeve 10 is inserted into an opening in the first component 3 so far until the fastening flange abuts a side of the first component 3. The opening in the first component 3 may be formed round. The locking notches 20 therefore face the opposite second side of the first component 3 in this inserted state. A distance between the locking notches 20 and the fastening flange 14 is therefore adapted to the thickness of the first component 3 in the portion of the respective opening.

Furthermore, the outer sleeve 10 has a first 22 as well as third fastening feature 24 adjacent to the second axial end in the inside, which serve for fastening a spacer sleeve 30, as will be explained later. Furthermore, a holding feature 26 is provided adjacent to the first axial end of the outer sleeve 10, here in the form of a radially inwardly protruding projection. The significance of this projection will be discussed later in connection with the embodiment of the connection element 1.

Figure 2:
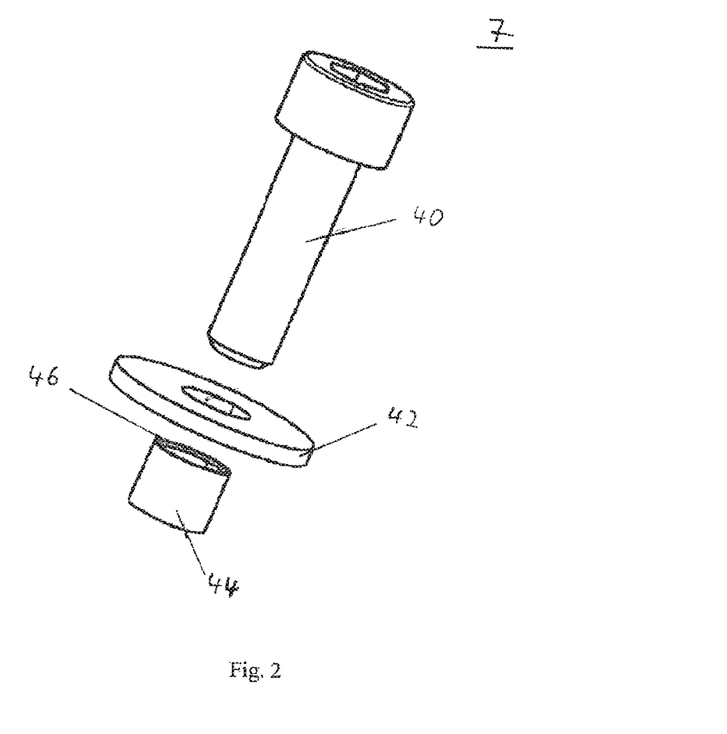
FIG. 2 an exploded view of a subassembly of an embodiment of the connection element consisting of screw, tolerance compensation disc and securing bush, FIG. 3 the subassembly according to FIG. 2 in an assembled state, FIG. 4 an exploded view of an embodiment of the connection element, FIG. 5 a perspective view of the embodiment according to FIG. 4 in an assembled state from above, FIG. 6 a perspective view of the embodiment according to FIG. 4 in an assembled state from below, FIG. 7 a top view onto the embodiment according to FIG. 4 in an assembled state with a centrally arranged screw, FIG. 8 a sectional view of the embodiment according to FIG. 4 in an assembled state, FIG. 9 a sectional view of the embodiment according to FIG. 4 in an assembled and installed state, FIG. 10 a top view onto the embodiment according to FIG. 4 in an assembled state with an eccentrically arranged screw, FIG. 11 a sectional view of the embodiment according to FIG. 10 in an installed state, FIG. 12 a flow chart of a first embodiment of a connection method, FIG. 13 a flow chart of a second embodiment of a connection method, FIG. 14 a flow chart of an embodiment of a manufacturing method of an outer sleeve, and FIG. 15 a flow chart of an embodiment of a manufacturing method of a connection element.
Figure 3:
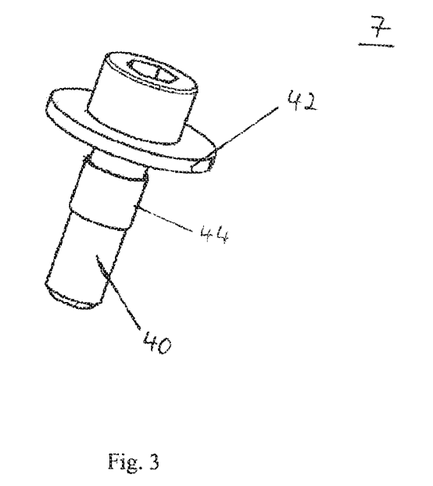
Figure 4:
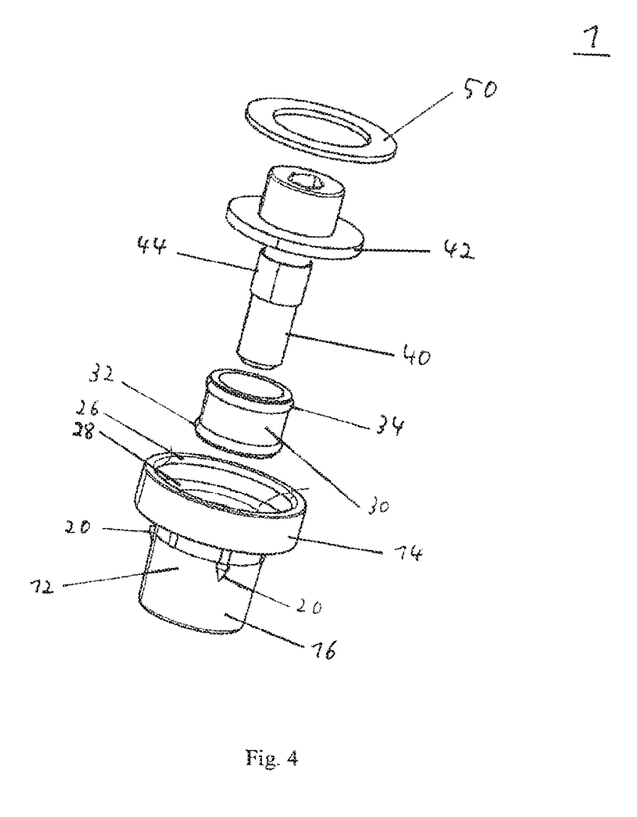
Figure 5:
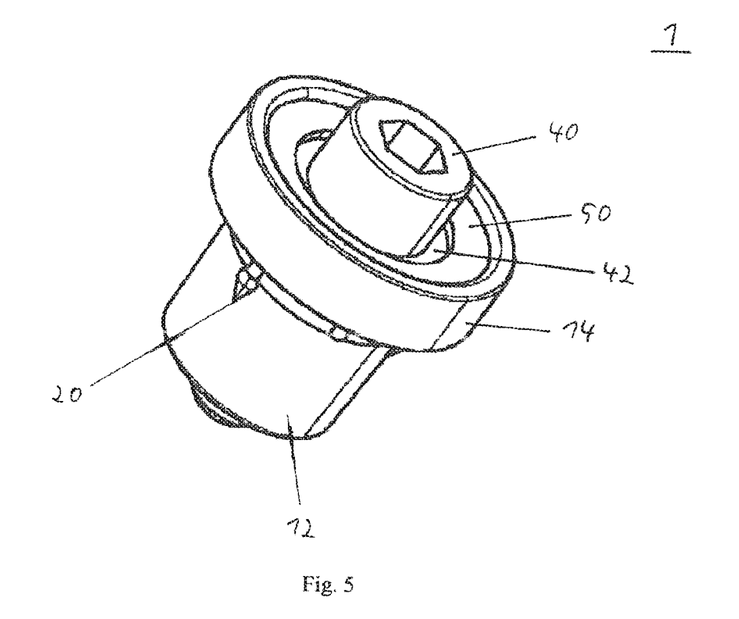
Figure 6:
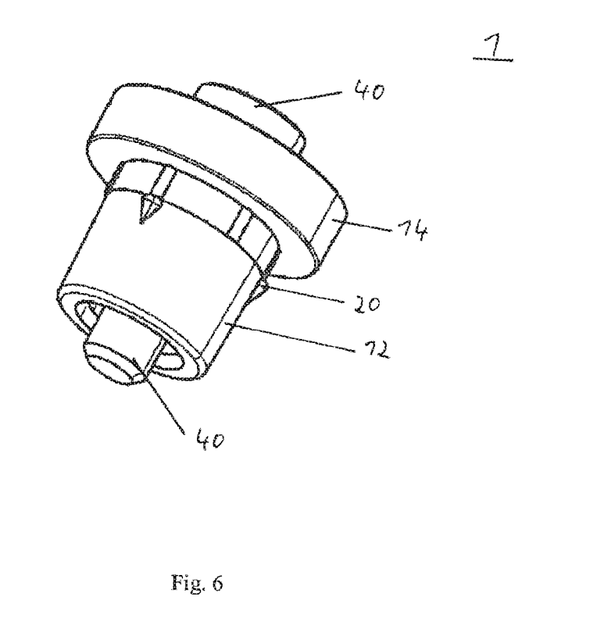
Figure 7:
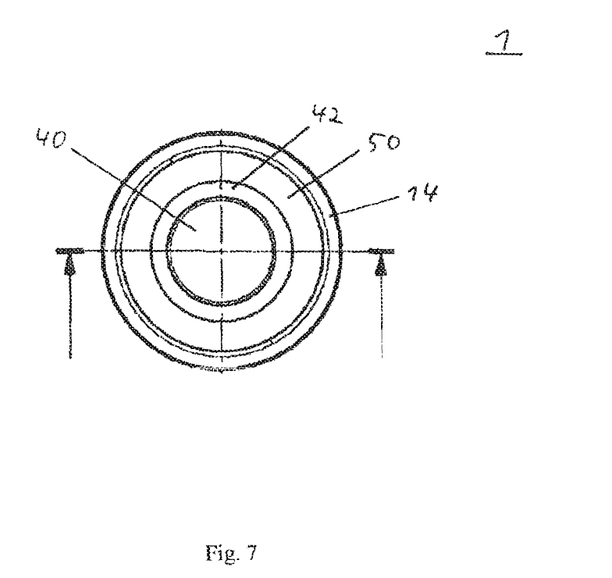
Figure 8:
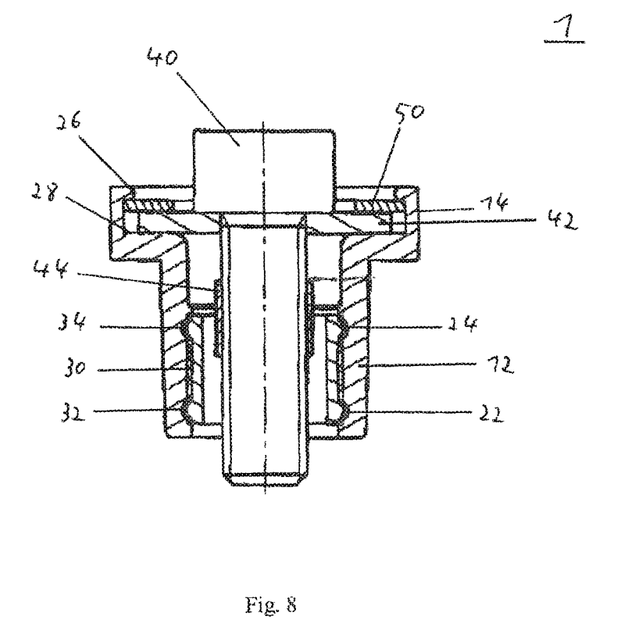

Now, with reference to FIGS. 2 and 3, a subassembly 7 of the connection element 1 is illustrated. This subassembly 7 consists of a screw 40, the tolerance compensation disc 42 as well as a securing bush 44, which may consist of plastic material and includes an inner chamfer 46. The screw 40 is for example a metric screw, even though other kinds of screws can be used, too.

The diameter of the opening in the tolerance compensation disc 42 is only slightly larger than the diameter of the outer thread of the screw 40. Thus, the tolerance compensation disc 42 only has little play but can smoothly be shifted axially. The securing bush 44 out of plastic material has a smaller inner diameter than the outer thread of the screw 40. Therefore, the securing bush 44 is pressed onto the outer thread of the screw 40. This process is facilitated by the chamfer of the screw 40 and the inner chamfer 46 of the securing bush 44. An outer diameter of the securing bush 44 is chosen slightly larger than the inner diameter of the tolerance compensation disc 42. Principally, in this state, the securing bush 44 serves as an anti-loss security for the tolerance compensation disc 42. In this way, an automatic processing of the screw 40 with tolerance compensation disc 42 arranged thereon can be realized.

With regard to the axial height of the arrangement of the securing bush 44, the latter is slid onto the screw 40 so far that a defined distance between head bottom side of the screw 40 and the end of the securing bush 44 arises, the end facing the screw head. The distance is chosen such that it corresponds to a protrusion of the screw 40 over the second axial end of the outer sleeve 10 when the screw 40 is inserted into the outer sleeve 10. This defined interim space is important for the faultless function of the connection element 1, in particular in case of a completely automated processing, as becomes clear later on.

FIG. 3 shows the assembled subassembly consisting of screw 40, tolerance compensation disc 42 as well as securing bush 44.

In the following, reference is made to FIGS. 4-8 which show an embodiment of a connection element 1, wherein with regard to the outer sleeve 10, reference is made to the above descriptions. A spacer sleeve 30 is arranged adjacent to the second axial end of the outer sleeve 10. The spacer sleeve 30 may consist of steel, even though a configuration out of plastic material may also be realized. The spacer sleeve 30 is for example slid into the outer sleeve 10 until the second fastening feature 32 and the fourth fastening feature 34 of the spacer sleeve 30 interact with corresponding first fastening features 22 and third fastening features 24 of the outer sleeve 10. The second 32 and fourth fastening feature 34 of the spacer sleeve 30 are for example beads and the first 22 and the third fastening feature 24 of the outer sleeve 10 are corresponding complementary forms. Instead of the beads, grooves can also be provided at the spacer sleeve 30. In this connection, it is important that the inner contour of the outer sleeve 10 in the inner portion of the folding zone 16 is adapted to that.

Now, the screw 40 with tolerance compensation disc 42 and securing bush 44 arranged thereon is inserted into the outer sleeve 10 from the first axial end of the outer sleeve 10. In this way, a bottom side of the tolerance compensation disc 42 comes into contact with the contact surface 28, which arises due to the step between the first inner diameter and the second inner diameter. In this connection, an outer diameter of the tolerance compensation disc 42 is chosen such that it is smaller than the first inner diameter in the fastening flange 14. In this way, a radial play is present in the portion of the fastening flange 14. Similarly, the second inner diameter of the outer sleeve 10 as well as the third inner diameter of the spacer sleeve 30 are chosen such that they are larger than the outer diameter of the screw 40 as well as of the securing bush 44. In this way, the screw 40 is overall arranged in the outer sleeve 10 with a radial play. The radial play can be adapted depending on the respective application case by means of a suitable dimensioning. It is particularly advantageous that in the centered state of the screw 40 in the outer sleeve 10, a radial distance between the radial outside of the securing bush 44 and the radial inside of the spacer sleeve 30, and the radial outside of the tolerance compensation disc 42 and the radial inside of the fastening flange 14 is equal. In an exemplary embodiment, the distance is 1 mm, so that radial tolerances in the range of ±1 mm can be compensated.

Once this has taken place, the holding disc 50 is inserted into the fastening flange 14 from the first axial end of the outer sleeve 10. An outer diameter of the holding disc 50 is chosen such that the radial outside of the holding disc 50 interacts with the holding feature 26 in the portion of the fastening flange 14. An inner diameter of the holding disc 50 is chosen such that it is smaller than the outer diameter of the tolerance compensation disc 42, but larger than the outer diameter of the head of the screw 40.

When a first component 3 in a vehicle is intended to be fastened at, for example, three or more connection points, the first component 3 includes corresponding openings into which the connection element 1 is plugged until it locks behind the locking notches 20. At the second component 5, for example the vehicle body, fastening portions with inner thread are provided at the corresponding positions, for example in the form of weld nuts. Later, the screw 40 is screwed into these fastening portions with inner thread.

However, first of all, the first component 3 is positioned such that the connection element 1 and thus the screws 40 are aligned with all fastening portions of the second component 5. In order to support the screwing in of the screws 40, the screws 40 can include a center point. Furthermore, the screws 40 have a drive feature at the screw head. In the illustrated example, this is a hexagon socket. Other inner drive features can be realized, too. Moreover, the use of an outer drive feature is possible, too.

Figure 9:
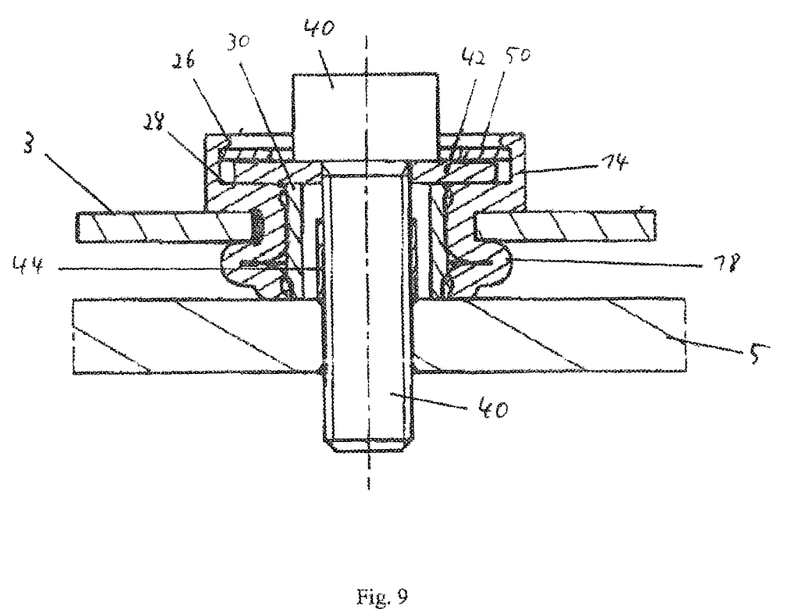

When tightening the screw 40, a compression bead 18 forms underneath the locking notches 20, so that the edge of the opening in the first component 3 is enclosed by the outer sleeve 10. The tightening takes place until the spacer sleeve 30 abuts the second component 5 with one end and the tolerance compensation disc 42 with the other end. In particular when the tolerance compensation disc 42 and the spacer sleeve 30 are of a metal, e.g. steel, a high-strength screwing can be realized.

A particular advantage of this connection element 1 is that it can compensate distance tolerances of the individual connection points. The tolerance compensation disc 42 is therefore not clipped behind the holding feature 26 but has a radial play in the portion of the fastening flange 14. The same applies to the screw 40 in the outer sleeve 10. In the outer sleeve 10, the subassembly 7 is held by means of the holding disc 50, wherein before the fastening, only the screw 40 can move in an axial direction, so that an accidental pushing out of the holding disc 50 from the outer sleeve 10 is avoided.

For this purpose, the distance between the bottom side of the head of the screw 40 and the end of the securing bush 44 which faces the head of the screw is chosen such that in the delivery state of the connection element 1, the screw 40 does not project at the bottom edge, when the securing bush 44 abuts the tolerance compensation disc 42. This is important so that the holding disc 50 cannot be pushed out of the rear locking in case of an improper handling of the connection element 1.

Figure 10:
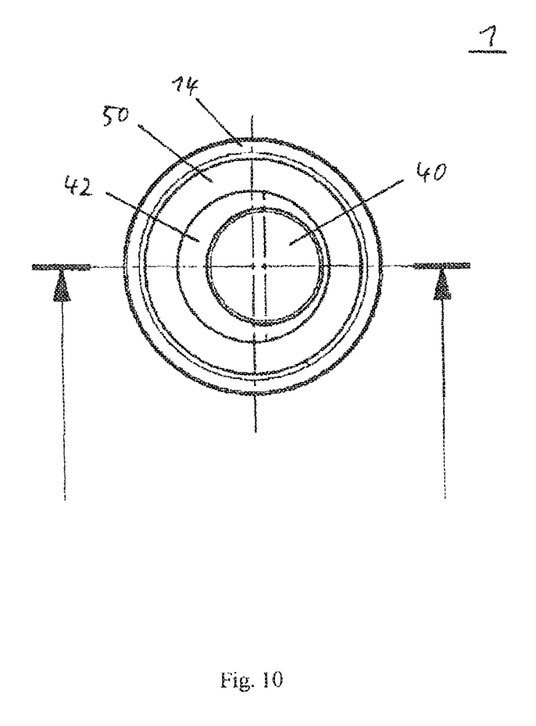
Figure 11:
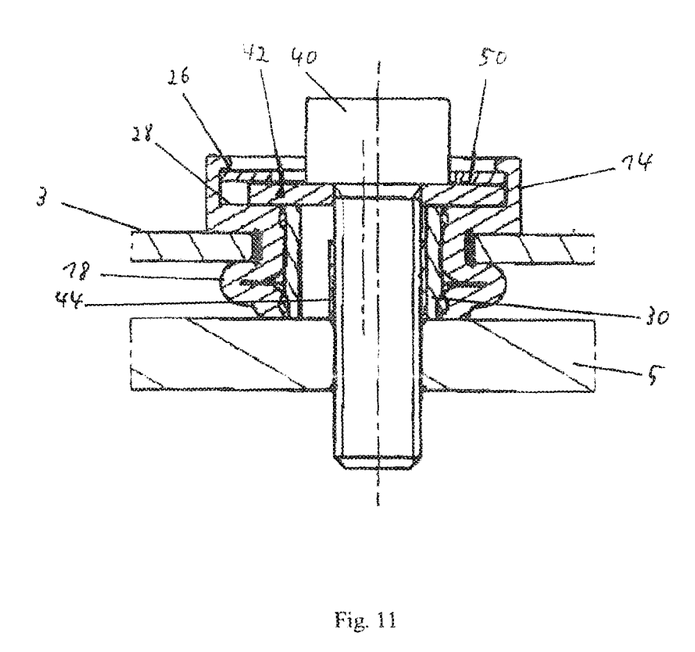

An exemplary illustration of a connection with which the radial play is taken advantage of is illustrated in FIGS. 10 and 11. Here, the screw 40 with tolerance compensation disc 42 and securing bush 44 is arranged eccentrically and is in contact with the radial inside of the spacer sleeve 30 and the fastening flange 14.

Figure 12:
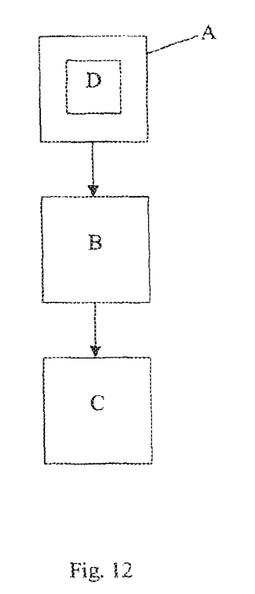

FIG. 12 shows a flow chart of an embodiment of a connection method of a first component 3 with a second component 5 by means of a connection element 1. In a first step A, a providing of the first component 3 with an outer sleeve 10 of the connection element 1 that is arranged in a first opening of the first component 3 takes place. In this context, step A of the providing may comprise step D of the arranging of the outer sleeve 10 in the first opening. In this connection, the first component 3 may be equipped with a plurality of outer sleeves 10 which are arranged in a plurality of first openings, in particular at least two, or at least three.

After that, in a further step B, an aligning of the at least one opening of the first component 3 with outer sleeve 10 of the connection element 1 arranged therein with at least one fastening portion of the second component 5 takes place. As described above, the fastening portion provides an inner thread which matches an outer thread of the screw 40 of the connection element 1. Finally, in step C, a screwing-in of the screw 40 into the inner thread of the fastening portion takes place.

Figure 13:
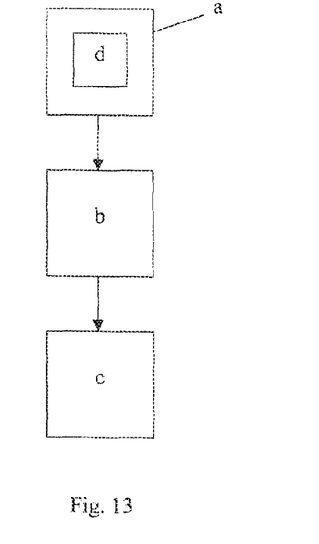

A further flow chart of an embodiment of a connection method is illustrated in FIG. 13. The specialty of this method, particularly in comparison with the method according to FIG. 12, is based on the configuration of the used connection element 1. The connection element 1 used with this connection method additionally comprises a holding disc 50. An inner diameter of the holding disc 50 is smaller than the outer diameter of the tolerance compensation disc 42. Furthermore, the radial outer portion of the holding disc 50 engages a holding feature 26 at the radial inside of the outer sleeve 10 adjacent to the first axial end. In this way, the tolerance compensation disc 42 is arranged in the outer sleeve 10 with a radial play and is held in axial direction due to the holding disc 50. The screw 40 already includes a securing bush 44 on the shaft, axially spaced with respect to a head of the screw 40. Therefore, the tolerance compensation disc 42 is held between the head and the securing bush 44 in a loss-proof manner, so that the subassembly 7 is overall arranged in a loss-proof manner in the outer sleeve 10.

The steps of the connection method itself correspond with the steps of the connection method that is already described above. In contrast to the above-described connection method, the steps can, however, be carried out in a completely automated manner due to the special design of the connection element 1. That means that in a first step a, a providing of the first component 3 with an outer sleeve 10 of the connection element 1 arranged in a first opening of the first component 3 takes place. In this connection, the step a of the providing may also include the step d of the arranging of the outer sleeve 10 in the first opening. In this context, the first component 3 may be equipped with a plurality of outer sleeves 10 which are arranged in a plurality of first openings, in particular at least two, or at least three.

After that, in a further step b, an aligning of the at least one opening of the first component 3 with outer sleeve of the connection element 1 arranged therein with at least one fastening portion of the second component 5 takes place. As described above, the fastening portion 5 provides an inner thread which matches an outer thread of a screw 40 of the connection element 1. Finally, in step c, a screwing-in of the screw 40 into the inner thread of the fastening portion takes place.

Figure 14:
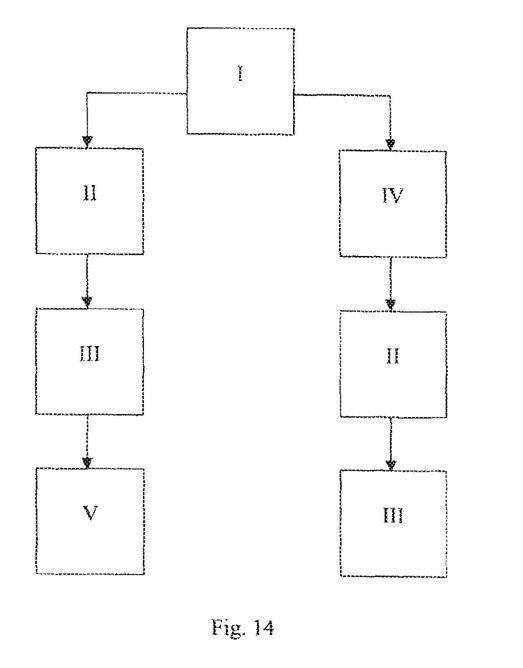

An embodiment of a manufacturing method for an outer sleeve 10 is illustrated in the flow chart of FIG. 14. In a first step I, a mold is provided, in particular an injection mold, having a cavity which is configured complementary with respect to the outer sleeve 10 to be formed. The manufacturing method is now divided into two different approaches.

In a first configuration, after the first step I, a molding, in particular an injection-molding, of an elastic plastic material, in particular of an elastomer, into the cavity takes place in a second step II. Subsequently, in step III, a removing of the formed outer sleeve 10 from the mold takes place after the plastic material has cured. Optionally, the outer sleeve 10 which has been formed in this way can already be provided with a spacer sleeve 30 by the further step V of the inserting of the spacer sleeve 30 into the outer sleeve 10 after removing the outer sleeve 10 from the mold.

In a second configuration, after the first step I, a providing of a spacer sleeve 30 in the mold before the molding takes place in a subsequent step IV, so that the spacer sleeve 30 is overmolded. Step II of the molding follows, in particular of the injection-molding, of an elastic plastic material, in particular of an elastomer, into the cavity. Now, in the next step III, a removing of the formed outer sleeve 10 from the mold takes place after the plastic material has cured. As in this case, the outer sleeve 10 is already formed directly with the spacer sleeve 30, step V of plugging the spacer sleeve 30 into the outer sleeve 10 is not necessary.

Figure 15:
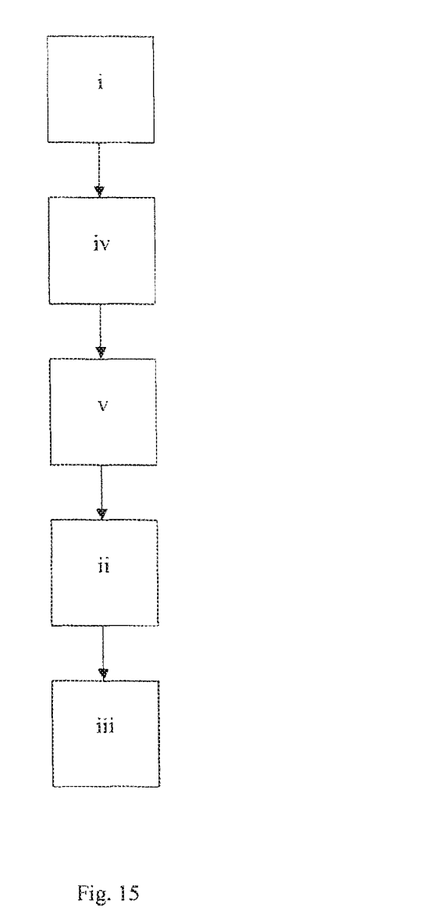

Finally, FIG. 15 shows a flow chart of a manufacturing method for a connection element 1. Here, in a first step i, a providing of an outer sleeve 10 and an arranging of a spacer sleeve 30 in it, adjacent to a second axial end of the outer sleeve 10 takes place. Provided that the outer sleeve 10 is already equipped with a spacer sleeve 30, for example due to the manufacturing by means of the above described manufacturing method, the step of arranging the spacer sleeve 30 in the outer sleeve 10 can be omitted.

Before that, parallel to it or after it, an arranging of a tolerance compensation disc 42 on the screw 40 takes place in step iv and after that, in step v, an arranging of the securing bush 44 on the shaft of the screw 40 takes place so that the tolerance compensation disc 42 is held between the head and the securing bush 44. The screw 40 which is configured in this way with tolerance compensation disc 42, is now plugged into the outer sleeve 10 and the spacer sleeve 30 in step ii, so that a head of the screw 40 as well as the tolerance compensation disc 42 are arranged adjacent to the first axial end of the outer sleeve 10. Finally, in step iii, an arranging of a holding disc 50 adjacent to the first axial end takes place so that the tolerance compensation disc 42 is held in axial direction.

The invention claimed is:

1. A connection element without a female thread with a damping function with which at least a first component and a second component are connectable by means of a screw connection, comprising the following features:
   a. an outer sleeve having:
      an elastic outer body with a sleeve-like shaft having a fastening flange at a first axial end and, adjacent to a second axial end, a hollow-cylindrical folding zone which is foldable to form a compression bead so that the first component can be supported between the fastening flange and the compression bead,
      a first inner diameter in a portion of the fastening flange and a second inner diameter in a portion of the hollow-cylindrical folding zone, wherein the first inner diameter is larger than the second inner diameter and the second component is attachable adjacent to the second axial end,
      a first as well as a third fastening feature in the portion of the hollow-cylindrical folding zone adjacent to the second axial end at a radial inside,
   b. a spacer sleeve with a third inner diameter that is arranged completely in the outer sleeve adjacent to the second axial end, wherein the spacer sleeve has a second and a fourth fastening feature interacting with the corresponding first and third fastening features of the outer sleeve and the second and fourth fastening feature of the spacer sleeve are beads or grooves and the first and third fastening feature of the outer sleeve are corresponding complementary forms,
   c. a screw with a first outer diameter, wherein the first outer diameter is smaller than the third inner diameter of the spacer sleeve, so that the screw is arranged in the outer sleeve with a radial play in a plane perpendicular to a longitudinal axis of the outer sleeve and that the second component is fixable by means of the screw adjacent to the second axial end of the outer sleeve of the connection element, d. a tolerance compensation disc arranged on a shaft of the screw, having a second outer diameter that is smaller than the first inner diameter of the outer sleeve so that the tolerance compensation disc is arranged with a radial play in the outer sleeve, e. a holding disc, an inner diameter of which is smaller than the second outer diameter of the tolerance compensation disc, but larger than an outer diameter of a head of the screw, and a radial outer portion of which engages a holding feature at a radial inside of the outer sleeve adjacent to the first axial end, so that the tolerance compensation disc is arranged with a radial play and is held in an axial direction due to the holding disc, wherein f. a screwing in of the screw causes a compression of the outer sleeve and thus a formation of the compression bead and takes place until the spacer sleeve prevents a further screwing so that the first component is arranged between the compression bead and the fastening flange, whereas the second component abuts the second axial end of the outer sleeve as well as the spacer sleeve.

2. The connection element according to claim 1, wherein the outer sleeve comprises a plurality of locking notches at a radial outside, so that the outer sleeve is fixable in a first opening in the first component such, that the first component is arrangeable between the fastening flange and the plurality of locking notches.

3. The connection element according to claim 1, the screw of which comprises a securing bush on the shaft, axially spaced with respect to the head of the screw, so that the tolerance compensation disc is held between the head and the securing bush.

4. The connection element according to claim 3, wherein a distance between the head and the securing bush corresponds to a maximum protrusion of the screw beyond the second axial end of the outer sleeve, so that when the screw is flush with the second axial end of the outer sleeve, the securing bush abuts the tolerance compensation disc.

5. The connection element according to claim 1, wherein the outer sleeve and the holding disc consists of a plastic material.

6. The connection element according to claim 1, wherein the spacer sleeve, the screw and the tolerance compensation disc consists of metal.

7. The first component with at least one opening and the connection element according to claim 1 arranged therein.

8. The first component according to claim 7 which includes a plurality of openings with outer sleeves or connection elements arranged therein.

9. The screw connection of the first component with the second component by means of the connection element according to claim 1, wherein the second component comprises a fastening portion with inner thread into which the screw is screwed in.

10. The screw connection according to claim 9, wherein the first component includes a plurality of openings with connection elements arranged therein, and the second component includes a corresponding number of fastening portions.

* * * * *